June 30, 1964   H. J. McSPADDEN ETAL   3,138,927
GAS GENERATOR
Filed July 18, 1962
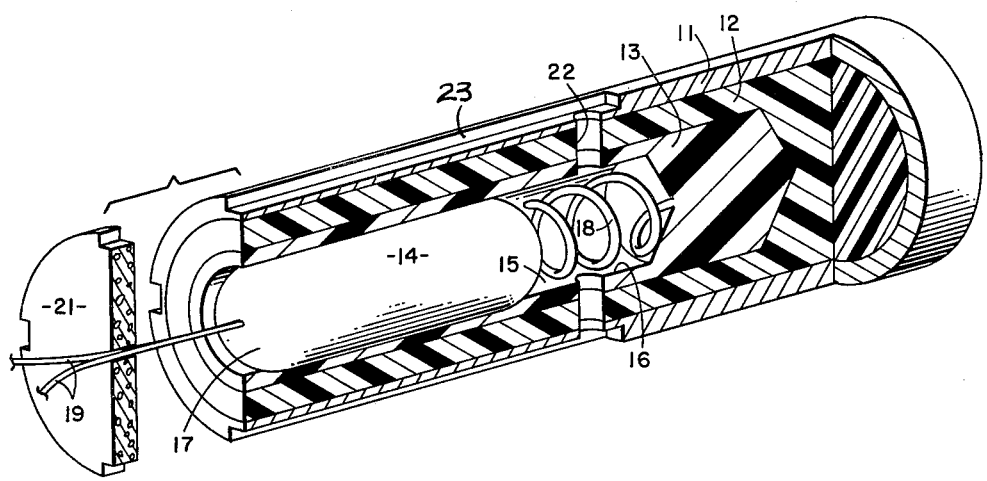
INVENTORS
HUGH J. McSPADDEN
DONALD D. KOBBEMAN
BY
*Stuart W. Wohlgemuth*
AGENT United States Patent Office 3,138,927
Patented June 30, 1964

3,138,927
GAS GENERATOR
Hugh J. McSpadden, Mesa, Ariz., and Donald D. Kobbeman, McGregor, Tex., assignors to North American Aviation, Inc.
Filed July 18, 1962, Ser. No. 210,655
5 Claims. (Cl. 60—39.47)

This invention concerns a novel gas generator. More particularly, the invention pertains to a solid propellant gas generator and novel ignition method therefor.

Most solid propellants today are not easily ignitable, if at all, at atmospheric pressures or less. In order to ignite such solid propellants, high chamber pressures are required before such ignition will transpire. A particular example of a solid propellant that is difficult to ignite at low chamber pressures is the ammonium nitrate type. When it is desired to use a propellant such as the ammonium nitrate type because of its ballistic characteristics and the relatively cool gases that it gives off, the aforementioned problem of ignition at low pressures can arise. High chamber pressures are required to readily ignite the propellant. For example, chamber pressures of 500 p.s.i. to 2500 p.s.i. are generally utilized to ignite a propellant such as the ammonium nitrate type. At lower pressures than these, the time to reach the kindling point of the propellant is greatly extended and in addition the ignition of the propellant is not particularly reliable. Many of the exisitng designs utilize, for example, a nozzle burst diaphragm and excessive amounts of ignition material to build up an initial pressure in the chamber in order to insure proper ignition of the solid propellant charge. The maximum value of this initial pressure is known as the ignition pressure and will match the pressure sustained until the burst diaphragm is ruptured and the primary combustion has started.

Thus an object of this invention is to provide a novel gas generator configuration.

Another object of the invention is to provide a means for igniting the gas generator at atmospheric pressure or less.

Another object of the invention is to provide a means for igniting the gas generator at atmospheric pressure or less with minimum amounts of ignition material.

The invention concerns a device having an outer material or restrictor generally in a cylindrical shape. Situated within the restrictor material and concentrically disposed is a relatively cool-burning first propellant grain which may have an ammonium nitrate base. The ammonium nitrate or cool-burning propellant is basically the gas-generating material utilized in the application for the device. Situated concentrically within the cool-burning external propellant material is a second propellant grain with propellant material which is generally of a higher-burning order such as ammonium perchlorate-type propellant. The second or internal propellant is in immediate contact with the cooler-burning first propellant grain. In a hole drilled concentrically within the second propellant is placed a coil made of the same material as the second propellant and a conventional small squib igniter adjacent the coil. A plurality of holes are drilled in the device which communicate from the inner chamber defined by the area drilled for the coil and squib to the outer edge of the restricted material and permit the escape of the gases that are being utilized in the given application. In operation the conventional squib is electrically-ignited and the coil of the second propellant catches the hot ignition particles from the squib and helps to ignite the second propellant charge which in turn causes ignition of the cooler-burning first propellant material releasing the gaseous discharge through the holes provided. It is believed the invention will be better understood from the following detailed description.

The figure is a perspective cross-sectional view of the gas generator device utilizing the novel igniter concept of this invention. A cylindrical thin-walled restrictor 11 contains the propellants used in the gas generator. This restrictor is usually of a rubber-based material such as polybutadiene filled with carbon black. Generally any inert non-combustible material that can be readily applied may be used as the restrictor. In addition to a rubber-based type restrictor, a material comprised of cellulose acetate, for example, can be utilized successfully for this application. The basic grain 12 to be ignited is of a relatively cool-burning propellant material. In a gas generator application, it is particularly important that the propellant be of a relatively cool-burning nature relatively speaking, since the higher flame temperatures and gas temperatures of certain propellants could cause damage to the metallic parts which come in contact with the gases escaping from the generator. Additionally, it is important in gas generator application that the propellant material not shatter or give off small particles in the exhaust stream as these can be extremely damaging to the parts with which the gas comes in contact. In other words it is particularly desirable that the propellant have as low a brisance as possible. One propellant having the particular desired properties is an ammonium nitrate-base grain. This propellant has a flame temperature of about 2200° F. Other relatively low-temperature burning propellants usable are double base. A typical propellant formulation comprising ammonium nitrate could utilize a binder of butadiene and methylvinylpyridine in a 90:10 ratio.

The propellant 12 can be formed by extrusion, that is, forcing it through a die under pressure. After the propellant is formed by the die, the grain is then cut to length from the extruded stock and given a finishing process. Upon manufacture, the propellant grain 12 is coated with the restrictor 11 and a hole is drilled therein to receive an additional inner propellant 13. The propellant 13 that is situated concentrically within the cooler-burning propellant 12 may be a grain comprised of basically metallized ammonium perchlorate type of propellant. This propellant is a great deal hotter-burning and has higher flame temperatures than the outer cooler-burning propellant 12. It is generally desired to use a hotter-burning propellant in order to generate the necessary heat to ignite the outer cooler-burning propellant. The inner propellant 13 is usually preformed and inserted into the hole drilled in the outer cooler-burning propellant 12. Such a propellant formulation that can be used as the hotter-burning propellant 13 would be comprised, for example, of ammonium perchlorate, aluminum metal particles and a binder material of polybutadieneacrylic acid. Other hotter-burning propellants usable are ammonium perchlorate-polysulfides, double base propellants, ammonium perchlorate-polyurethanes, etc.

After the propellant 13 has been placed within the outer propellant 12, a hole is then drilled concentrically within the hotter propellant 13 to receive an igniter squib 14 and leave, in addition, some open space 15 between the bottom of the squib and the end 16 of the hole drilled. This space 15, serves as an initial combustion area. The hole is drilled along the longitudinal axis of the device so that the igniter squib 14 sits concentrically on the longitudinal axis of the propellant grains and restrictor. The igniter squib 14 is situated adjacent one end of the device 17 and extends within the hole drilled just short of the end 16 of the hole drilled so as to leave a space therein for a coil 18 of the cast propellant that is used to ignite the hotter-burning inner propellant 13. This squib is well known in the art and is comprised of an enclosure filled with an ignitable material such as gunpowder and is arranged to be ignited electrically by a hot wire or a plurality of wires 19 buried within the powder. Any conventional squib may be used, it not being critical except where conditions require a completely consumable squib. The coil 18 is situated such that it is within the space 15 and is in actual contact with the grain 13 at the end 16 of the hole provided. This coil of propellant 18 is comprised normally of the same material that forms the hotter-burning propellant 13 and is prepared from the shavings from a drilled bit for example, when the cast propellant 13 has been drilled. It should be understood that the coil need not be of the same propellant that comprises 13 but may be made from any relatively hot-burning and easily ignited cast propellant material. Additionally, the shape, length of and number of turns in the coil is not critical, but rather dependent upon the given application and size of the device.

The end of the device 17 which contains the squib 14 and hot-burning propellant 13 is capped with a cement material or any like solid heavy restrictor material 21. The lead wires 19 to the igniter 14 extend through the cap 21 so that the squib may be readily ignited.

A plurality of apertures 22 are provided within the restrictor, the composite propellant 12 and through the cast propellant 13 into the space 15 provided between the end of the restrictor and bottom of the hole drilled in the cast propellant. In the particular example shown, there are four apertures provided. The number of the apertures is dependent on the size and application of the device. The apertures 22 serve several functions. First of all, they act to prevent excessive pressure build-up when the squib 14 is fired. Secondly, they act as nozzles to regulate the pressure in the combustion area 15 and thereby stabilize the burning of the propellant. Thirdly, the apertures 22 guide the hot flame of the castable propellant 13 over the surface of the cooler-burning extruded propellant 12 assuring a uniform and reliable ignition of the propellant 12.

The operation of the device consists of electrically exciting the igniter squib 14 causing the decomposition and burning thereof. The coil of propellant 18 is ignited from flame and hot particles being admitted from the squib igniter. The coil configuration is chosen because the most exposed surface area per unit weight can be obtained through this design. This obviously facilitates the admission of flame and hot particles to the inner propellant 13. It is at this time that the real combustion of the device begins within the combustion chamber 15. The hotter-burning propellant 13 is initially ignited from the coil and parts of the squib and burns away until the cooler outer propellant 12 is ignited. The hot gases being generated by the burning propellants are emitted from the aperture 22 to serve their given function.

One application of the device can be for the generation of gas in the secondary recovery of oil wells. For such a use the device is inserted within a metal sleeve, not shown, which is tight-fitted to the outer circumference of the gas generator. Because of the tight fit, channels 23 run longitudinally on the outer circumference of the restrictor and communicate with the apertures 22. These channels serve for the ultimate release of the gases from the metal tube enclosure.

Though discussion of the device has been oriented to the use of a hotter-burning propellant within a cooler-burning one, such a requirement is not mandatory. If a cooler-burning propellant is used as the internal propellant, a longer ignition delay will result. Generally, a longer ignition delay is not desirable in the art and can create many problems with the ultimate ignition of the external propellant.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A gas generator ignitable at atmospheric pressure comprising:
   an enclosure means,
   a first combustible means disposed with said enclosure means,
   a second combustible means disposed within said first combustible means, said second combustible means having a concentric chamber therein,
   an ignition means situated within said chamber spatially displaced from an end thereof forming a combustion space within said chamber,
   a coil of combustible material disposed in said combustion space for transmitting ignition from said ignition means to cause ignition of said second combustible means,
   and gas escape means communicating between said chamber and the exterior of said enclosure means.

2. The gas generator of claim 1 wherein said enclosure means comprises a tubular-shaped solid propellant restrictor.

3. The gas generator of claim 2 wherein both said first and second combustible means are solid propellant grains.

4. A gas generator ignitable at atmospheric pressure comprising:
   a tubular-shaped restrictor,
   a first propellant grain disposed within said restrictor, said propellant grain having an aperture centrally provided at one end thereof,
   a second solid cylindrical propellant grain disposed within said aperture, said second grain provided with an opening concentrically disposed therein and partially extending from an outer end of said grain along the longitudinal axis thereof terminating within said grain,
   an igniter squib disposed within said opening in said second grain,
   an outer end of said squib co-adjacent with said end of said grain and an inner end of said squib spatially displaced from the termination of said opening providing a combustion chamber area therein,
   a coil of solid propellant disposed within said combustion chamber area with one end of said coil adjacent to said inner end of said squib and the other end of coil in contact with said second propellant grain,
   and at least one aperture communicating from said combustion chamber through said restrictor.

5. The gas generator of claim 4 wherein said second propellant grain is hotter-burning than said first propellant grain.

References Cited in the file of this patent

UNITED STATES PATENTS

| | | |
|---|---|---|
| 2,090,608 | Holm | Aug. 17, 1937 |
| 2,759,418 | Ross | Aug. 21, 1956 |
| 2,942,547 | Rabern | June 28, 1960 |